3,020,127
PREPARATION OF DIBORANE
Robert D. Schultz, East Whittier, and Carl L. Randolph, Jr., Whittier, Calif., assignors to Aerojet-General Corporation, Azusa, Calif., a corporation of Ohio
No Drawing. Filed May 16, 1955, Ser. No. 508,810
16 Claims. (Cl. 23—204)

This invention relates to a new and improved method for preparing diborane.

Diborane is an excellent high energy fuel. Unfortunately, however, its use has been severely limited due to the lack of a convenient and inexpensive method of preparation.

Heretofore, diborane has been prepared by reacting boron trifluoride with sodium or lithium borohydride or sodium or lithium hydride in an ether suspension. These methods are slow and tedious, difficult to control and require expensive starting materials and solvents, or suspension media, which renders them commercially impractical. Diborane has also been prepared by reacting alkali metal borohydrides with hydrogen chloride gas at room temperature or with liquid hydrogen chloride at a temperature of −78° C. These methods are very slow, requiring reaction periods of from 16 to 24 hours. In addition, an azeotropic mixture of diborane and hydrogen chloride is formed which is very difficult to separate.

We have now found a rapid and convenient method of preparing diborane in good yield, which is also readily applicable to large scale production. The reaction is usually completed in a matter of minutes at room temperature. No solvents or suspension media are required. The reaction takes place at a solid-liquid interface, thus eliminating the handling of gaseous reactants. In addition, the formation of azeotropic gas mixtures is avoided.

According to this invention, diborane is prepared by reacting a metal borohydride with an anhydrous, halogenated phosphoric or acetic acid, in accordance with the general reaction scheme set forth below:

$$MBH_4 + H^+ \rightarrow B_2H_6 + H_2 + M^+$$

wherein M is a metal ion.

Fluorinated, chlorinated and brominated phosphoric and acetic acids are preferred as protolyzing acids. The corresponding iodo acids, while also acting as protolyzing acids, form in addition to diborane undesirable by-products which render the recovery of diborane difficult. As a matter of convenience, the halogenated phosphoric and acetic acids, which are liquids at a temperature between about −10° C. and about 65° C., are generally used.

Acids useful in the practice of this invention include: monofluorophosphoric, difluorophosphoric, trifluoroacetic, difluoroacetic, trichloroacetic, dichloroacetic, dibromoacetic, chloroacetic, fluoroacetic and bromoacetic acids.

The metal borohydrides useful in the practice of this invention are the alkali and alkaline earth metal borohydrides such as sodium borohydride, potassium borohydride, magnesium borohydride, calcium borohydride, etc.

The reaction is preferably conducted in a reactor sealed from the air and equipped with a gas outlet leading to a low temperature trap. The acid is placed in the reactor under either vacuum or an atmosphere of nitrogen and finely divided borohydride added with agitation. During the course of the reaction, a gentle evolution of hydrogen and diborane gases takes place. These gases are vented through the gas outlet and collected in the low temperature trap.

Optimum resules are obtained when the reaction is conducted at a temperature in the range of from about 0° C. to about 35° C. At lower temperatures, the reaction is generally too slow for convenient commercial use, while at higher temperatures, the reaction becomes difficult to control.

To more clearly illustrate this invention, the following examples are presented. It is to be understood, however, that these examples are presented merely as a means of illustration and are not intended to limit the scope of the invention in any way.

EXAMPLE I

*Preparation of diborane with monofluorophosphoric acid*

0.6 gm. of sodium borohydride (95% pure) was dropped into approximately 50 cc. of anhydrous monofluorophosphoric acid under a nitrogen atmosphere. A nitrogen gas flow of approximately 60 cc./min. was used to sweep the evolved gas from the reactor through a trap cooled in liquid nitrogen. The product collected in the trap was identified as nearly pure diborane by its vapor tension of 225 mm. at −111.9° C., and by its infrared absorption spectra. The diborane was produced in 60% yield.

EXAMPLE II

*Preparation of diborane with monofluorophosphoric acid*

0.6 gm. of sodium borohydride (95% pure) was dropped into approximately 50 cc. of anhydrous monofluorophosphoric acid under a vacuum. The product collected in the trap was identified as nearly pure diborane by its vapor tension of 225 mm. at −111.9° C., and by its infrared absorption spectra. The diborane was produced in 79% yield.

EXAMPLE III

*Preparation of diborane with monofluorophosphoric acid*

Anhydrous monofluorophosphoric acid in 1–2 cc. amount was placed in a standard 17 mm. test tube and a crystal of sodium borohydride, approximately 2 x 25 x 3 mm. in size, was dropped into the tube in the presence of air. The reaction proceeded smoothly, with the evolution of gas, namely, diborane and hydrogen.

EXAMPLE IV

*Preparation of diborane with trifluoroacetic acid*

Trifluoroacetic acid in 1–2 cc. amount was placed in a standard 17 mm. test tube and a crystal of sodium borohydride, approximately 2 x 25 x 3 mm. in size, was dropped into the tube in the presence of air. The reaction proceeded smoothly, with the evolution of gas, namely, diborane and hydrogen.

As can be seen from the above discussion, the process of this invention overcomes the difficulties which have made heretofore known methods of producing diborane expensive and commercially impractical. No expensive solvents, starting materials or suspension media are required. The reaction is conducted in a liquid phase eliminating the complications of a gas-solid interface. The reaction proceeds readily at room temperature thus eliminating the necessity for high or low temperature equipment. In addition, the reaction is rapid, but not explosive or uncontrollable, and produces diborane in high yield. As well as being useful as a high energy fuel, diborane also finds valuable use in vulcanizing rubber, as disclosed in United States Patent No. 2,558,559.

We claim:

1. A method of preparing diborane which comprises reacting a metal borohydride selected from the group consisting of the alkali and alkaline earth metal borohydrides with a protolyzing acid selected from the group consisting of halogenated phosphoric acid and halogenated acetic acid.

2. The method of claim 1 wherein the protolyzing acid is monofluorophosphoric acid.

3. The method of claim 1 wherein the protolyzing acid is difluorophosphoric acid.

4. The method of claim 1 wherein the protolyzing acid is trichloroacetic acid.

5. The method of claim 1 wherein the protolyzing acid is trichloroacetic acid.

6. The method of claim 1 wherein the protolyzing acid is difluoroacetic acid.

7. A method of preparing diborane which comprises reacting a metallic borohydride selected from the group consisting of the alkali and alkaline earth metal borohydrides with a protolyzing acid, said acid being a liquid at a temperature in the range of from about $-10°$ C. to about 65° C., and selected from the group of acids consisting of monofluorophosphoric, difluorophosphoric, trifluoroacetic, difluoroacetic, trichloroacetic, dichloroacetic, dibromoacetic, fluoroacetic, chloroacetic, and bromoacetic acid.

8. The method of claim 7 wherein the reaction is conducted at a temperature in the range of from about 0° C. to about 35° C.

9. A method of preparing diborane which comprises reacting sodium borohydride with monofluorophosphoric acid.

10. A method of preparing diborane which comprises reacting sodium borohydride with trifluoroacetic acid.

11. A method of preparing diborane which comprises reacting sodium borohydride with trichloroacetic acid.

12. A method of preparing diborane which comprises reacting potassium borohydride with trifluoroacetic acid.

13. A method of preparing diborane which comprises reacting sodium borohydride with difluoroacetic acid.

14. A method of preparing diborane which comprises reacting sodium borohydride with difluorophosphoric acid.

15. A method of preparing diborane which comprises reacting sodium borohydride with dichloroacetic acid.

16. A method of preparing diborane which comprises reacting magnesium borohydride with monofluorophosphoric acid.

References Cited in the file of this patent

Wiberg et al.: "Zeitschrift für Naturforschung," vol. 7b, pp. 58–59 (1952).

Stock: "Hydrides of Boron and Silicon," 1933, pp. 40–41.

Schlesinger et al.: "Journal of the American Chemical Society," vol. 75, p. 199 (Jan. 5, 1953).

Schechter et al.: Boron Hydrides and Related Compounds, p. 52, Jan. 8, 1951, decl. Jan. 5, 1954, Bureau of Aeronautics, Dept. of Navy.

Hurd: "Chemistry of the Hydrides," p. 162 (1952), John Wiley and Sons, New York.